UNITED STATES PATENT OFFICE.

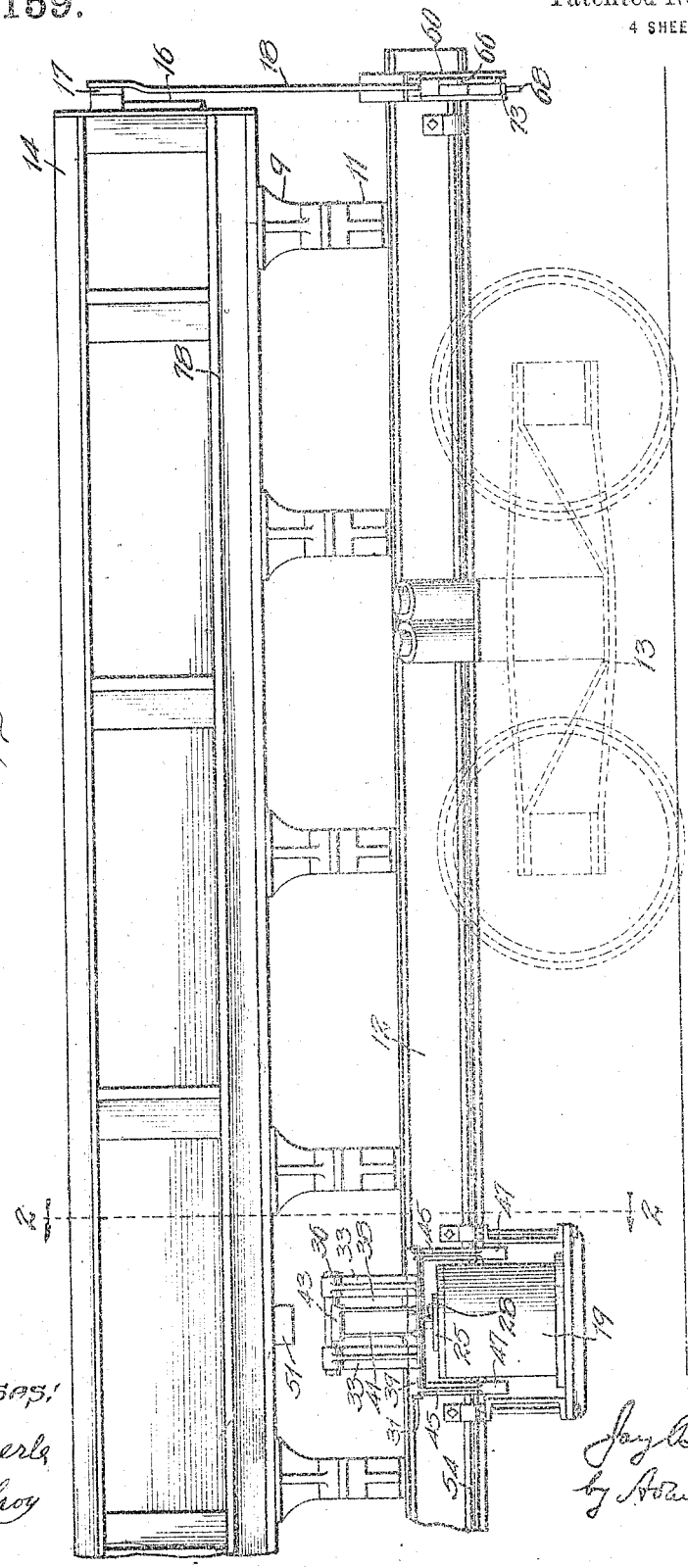

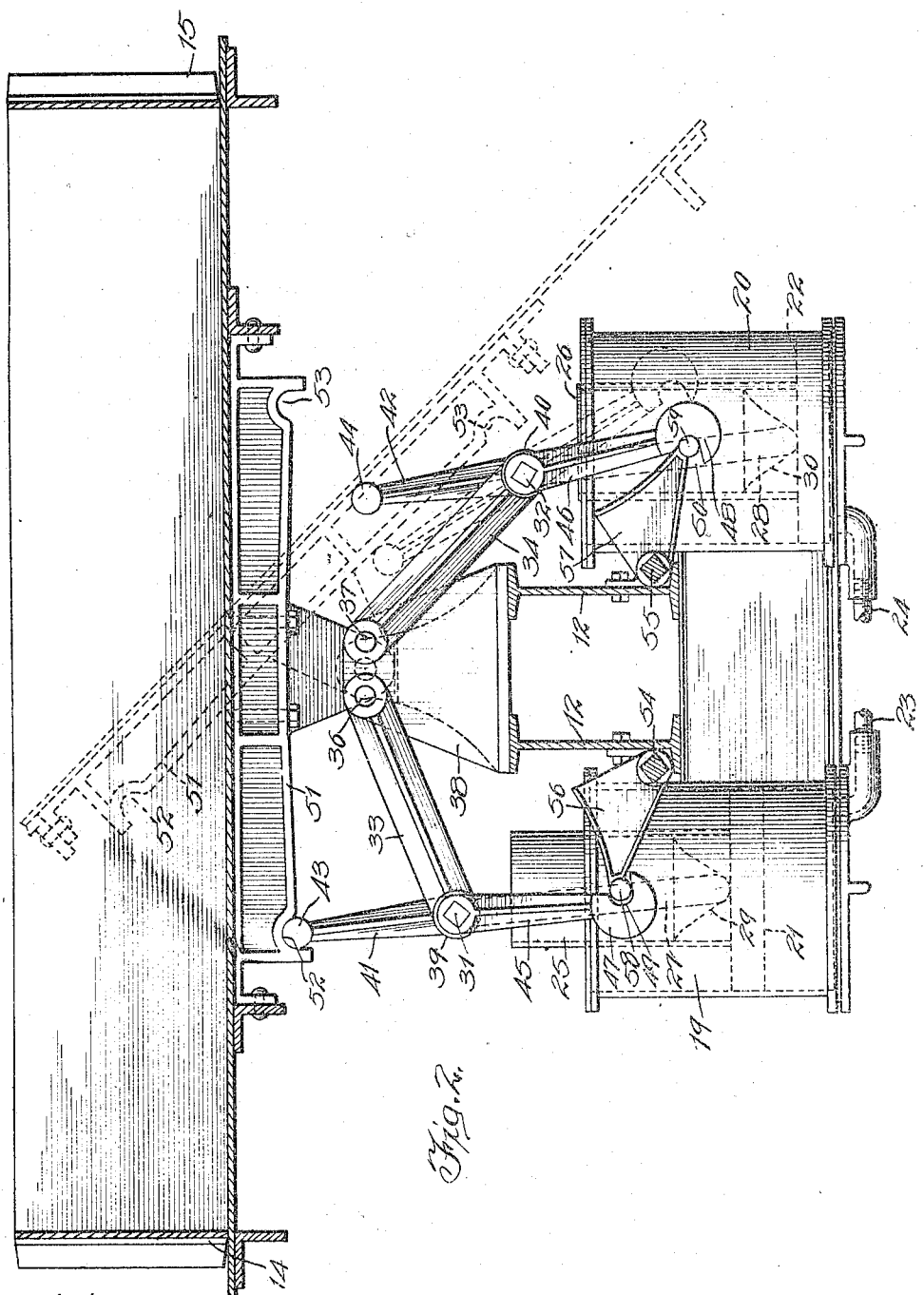

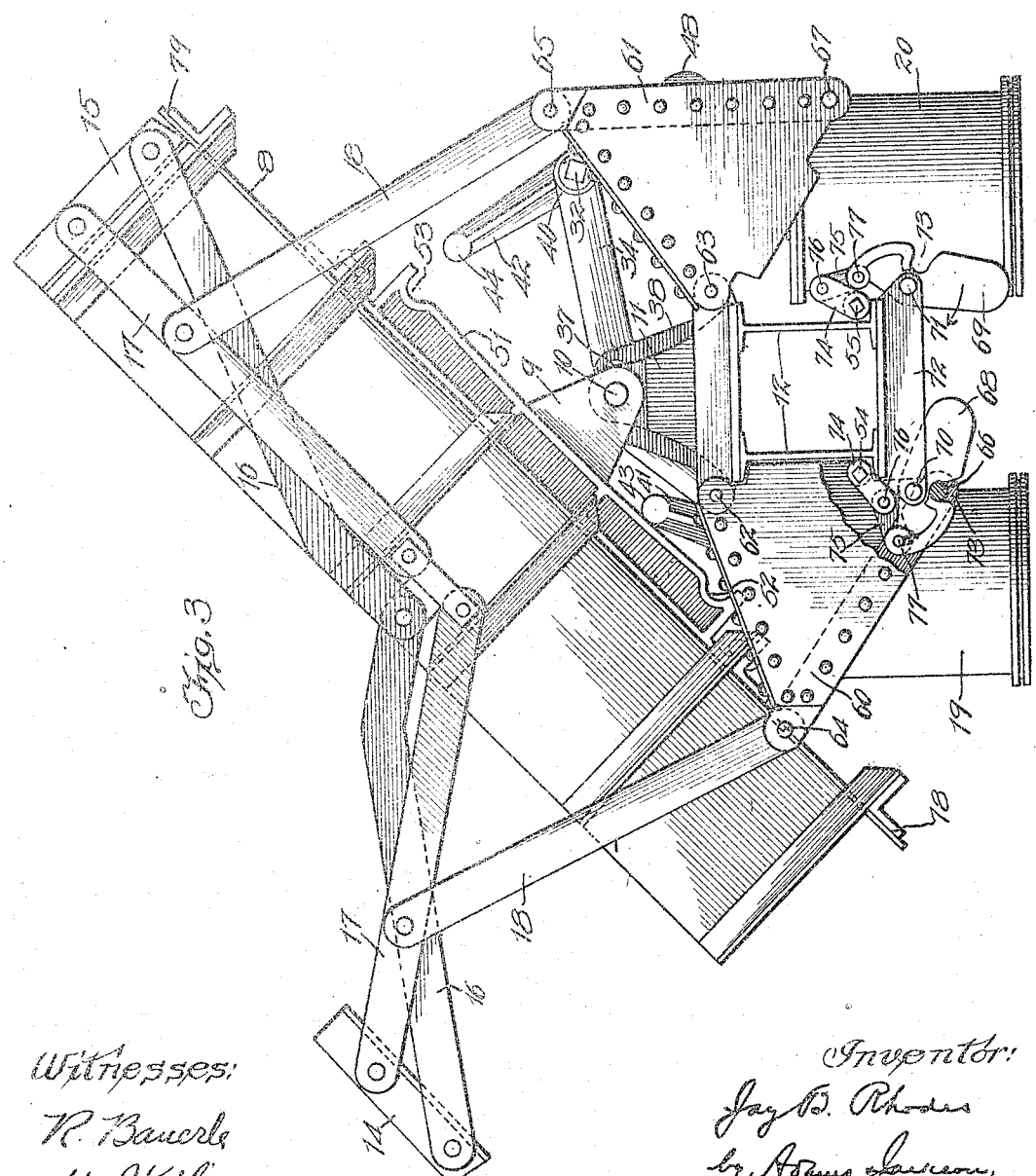

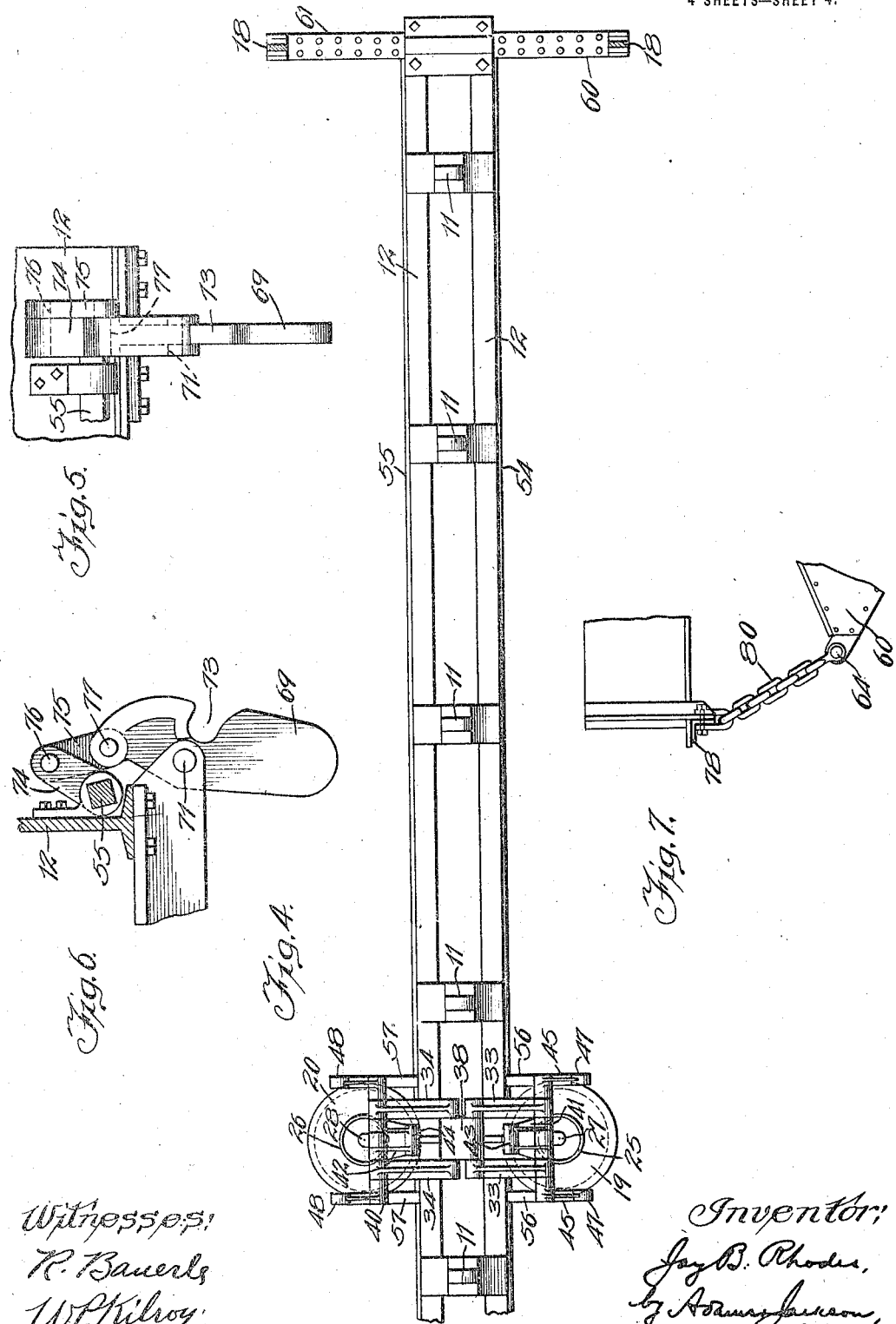

JAY B. RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

1,161,159.

Specification of Letters Patent.

Patented Nov. 23, 1915.

Application filed April 9, 1913. Serial No. 759,950.

*To all whom it may concern:*

Be it known that I, JAY B. RHODES, residing at Kalamazoo, in the county of Kalamazoo and State of Michigan, have invented certain new and useful Improvements in Dump-Cars, of which the following is a specification, reference being had to the accompanying drawings.

My invention relates to dump cars of the type in which the car body or bed is arranged to be tilted at either side to discharge its load, and has particularly to do with dump cars in which the dumping and also the righting of the car bed are effected by means of mechanism operated by power, such as compressed air, supplied from the locomotive. Such cars usually are provided with side gates, the gate on the dumping side being automatically held up out of operative position while the car is being dumped, but my invention may be applied also to car beds which are not provided with side gates, or from which the side gates have been removed.

The principal objects of my invention are to provide new and improved mechanism for tilting the car body or bed to discharge its load; to provide for righting the car bed, or restoring it to its normal position, and to provide suitable locking mechanism for securing the car body in operative position, and for preventing the bed from being tilted to the opposite side when being restored to its operative position. I accomplish these objects as illustrated in the drawings and hereinafter described.

What I regard as new is set forth in the claims.

Figure 1 is a side elevation of one end of a dump car, the truck being indicated in dotted lines; Fig. 2 is a vertical cross-section on line 2—2 of Fig. 1, showing the normal or operative position of the car in full lines, and the dumping position in dotted lines; Fig. 3 is an end view of the operating parts of the car, showing them in dumping position, some parts being broken away; Fig. 4 is a plan view of the under frame which supports the car body, illustrating also the dumping mechanism; Fig. 5 is an end view of one of the locking devices, and illustrating some of the connections thereof; Fig. 6 is a side view of the parts shown in Fig. 5, part of the frame and rock shaft being in section; and Fig. 7 is a view showing the arrangement employed where side gates are not used.

In the embodiment of my invention illustrated, the car body or bed is mounted centrally upon suitable pivotal bearings, so constructed and arranged that the bed may be tilted to dump its load at either side of the truck on which it is carried, but if desired rocker bearings arranged to carry the bed over toward the dumping side when it is being tilted so that the bed may assume a sharper angle without striking the side of the truck may be employed, such as bearings having the construction shown and described in my application for patent, Serial No. 678,647, filed April 1, 1912. Such bearings, however, separately considered, form no part of my present invention, and therefore I have shown in the drawings a simpler form which may be advantageously employed. The side gates are pivotally connected with the end portions of the bed by swinging arms and are automatically operated, when the bed is tilted, so that on the dumping side the gate is held up out of operative relation to the bed to permit the free discharge of the load. The tilting of the bed either to discharge its load or to restore it to normal position, is effected by means of compressed air operating in cylinders carried by the truck. Separate cylinders are employed for moving the bed in opposite directions, and in practice the several corresponding cylinders of the different cars of a train are connected by means of a train-pipe with each other and with a valve controlled by the engineer so that any desired car may be dumped singly, or all the cars of the train may be similarly operated simultaneously. In order to permit cars to be dumped singly, the several cars may be provided with valves by which the compressed air may be cut off from the operating cylinders, and in practice the valves of all the cars which are not to be dumped are closed to cut their cylinders off from the train-pipe, leaving only the cars to be dumped connected therewith, and consequently the admission of air to the train-pipe by the engineer effects the dumping of the connected cars, leaving the others in operative position. Of course, any one or more cars may thus be dumped at the same time. Locking mechanism is provided for holding the bed in operative position in transporting the load and for preventing the bed from accidentally tipping over on the opposite side when being restored to normal position, and such locking mechanism is arranged to operate automatically, either to lock the bed in normal position, or to release it so that it may be dumped at the proper side of the train.

Referring now to the drawings, 8 indicates the car bed, which is provided on its under-side with a series of centrally-disposed supports 9, adapted to be connected by pivots 10 with corresponding supports 11, mounted on longitudinally-extending I-beams 12, which form a part of the draft rigging, as best shown in Figs. 3 and 4. The I-beams 12 are secured to the trucks 13 in any suitable way, and carry the dumping or locking mechanism hereinafter described.

14—15 indicate the usual side gates, each of which is connected at its ends to the car body by links 16—17, which serve to swing the lower margin of the side gates outward in the well-known way when the car body is dumped. The side gate at the dumping side is held up out of the way in dumping by bars 18, which also operate in the well-known way, and therefore need not be particularly described.

19—20 indicate cylinders at opposite sides of the car, which cylinders are provided with pistons 21—22, respectively, actuated by the admission of compressed air to said cylinders to perform the operations of dumping the car body and restoring it to its normal position. They also operate, through intermediate mechanism, to unlock the car body as occasion requires.

23—24 indicate the pipes through which air is supplied to the cylinders 19—20, respectively, in the manner already described. The compressed air is admitted at the lower ends of the cylinders 19—20 and operates to force them up in their respective cylinders, their return being effected by gravity when the valves controlling the admission of air to the pipes 23—24 are operated to exhaust the air therefrom.

25—26 indicate cylindrical guides or stems for the pistons 21—22, respectively, and 27—28 indicate rocking piston rods actuated by the pistons. These piston rods are shown in dotted lines in Fig. 2. As therein shown, the lower ends of the piston rods 27—28 rest and operate in rocker bearings 29—30 at the upper sides of the pistons 21—22, and the upper ends of said piston rods are connected to short rock shafts 31—32, respectively, which are carried by pairs of swinging links 33—34, at opposite sides of the car, said links being pivoted at 36—37, respectively, to suitable supports 38, which rest upon the I-beams 12, as best shown in Figs. 2 and 4. Each of the shafts 31—32 also carries one or more, preferably a pair, of lock-releasing arms 39—40, which are mounted on their respective shafts intermediately of their ends, their upper end portions 41—42 being preferably rounded, as shown at 43—44 in Fig. 2, while their downwardly projecting portions 45—46, carry heads 47—48, having recesses 49—50, at their inner margins, as best shown in Fig. 2. The purpose of these recessed heads is to engage and release the locking mechanism by which the car bed is normally locked in operative position, as hereinafter described.

51 indicates bearing plates arranged transversely under the car bed and secured thereto so as to lie over the rounded upper end portions 43—44, of the arms 41—42, said plates having recesses 52—53, near their ends to receive the rounded portions 43—44, as shown in Fig. 2.

54—55 indicate longitudinally-extending rock shafts at opposite sides of the car and supported by the draft rigging, as shown in Fig. 2. Said rock shafts extend from end to end of the car and carry arms 56—57, which are preferably segmental in form, said arms being arranged opposite the heads 47—48 with which they are adapted to engage, as shown in Fig. 2. To facilitate such engagement, the arms 56—57 are provided with knobs or projections 58—59, which are adapted to enter the recesses 49—50, of the heads 47—48, as shown in Fig. 2, but said heads may be disengaged from said knobs by swinging the heads outward, as indicated by dotted lines in said figure. As the arms 56—57 are fixedly mounted on their respective rock shafts 54—55, obviously by rocking said arms, the shafts may be rocked. The purpose of rocking the rock shafts 54—55 is to operate the locking mechanism for the car body, and the manner in which said shafts are rocked will hereinafter appear.

60—61 indicate rocking members or frames at the ends of the car and at opposite sides thereof, said rocking members being pivoted, respectively, at 62—63, to the under frame of the car, so as to swing vertically, as shown in Fig. 3. Said rocking members are triangular in form and have connected with them at 64—65 the operating bars 18 by which the side gates are operated. At their lower inner angles, the members 60—61 are provided with pins 66—67, which coöperate with suitable retaining devices to effect the locking of the car bed, as will now be described.

68—69 indicate locking members, which are pivoted at 70—71, to the opposite end portions of a cross-bar 72, or other suitable support, forming a part of the under body of the car, as shown in Fig. 3. Said locking members are somewhat like a car coupling device, being in the form of a lever having a curved slot 73 arranged intermediately in one margin adjacent to the pivotal point, the arrangement being such that the swinging of the locking member moves it from its locking to its releasing or unlocking position. In Fig. 3, the locking member 68 is shown in locking position, and the member 69 in unlocking position. Said locking members are so disposed that when free to swing by gravity they will assume the unlocking position.

As shown in Fig. 3, the rock shafts 54—55 are each connected with the upper end portions of the locking members 68—69, respectively, by cranks 74 and links 75, the arrangement being such that when the links are in the position shown at the left in Fig. 3, the locking member 68 is swung into locking position and held so by reason of the fact that the pivot 76 connecting the link 75 with the crank 74 is in line, or substantially so, with the rock shaft 54 and the pivot 77 connecting the link 75 with the locking member 68. By swinging the rock shaft 54, however, so as to throw its cranks 74 upward, the locking member 68 is released and permitted to swing down into the position shown at the right in Fig. 3. The pivot 77 is so placed that when the locking member, as 68, is in the position shown in Fig. 3, the inner portion of its slot 73 is in line, or substantially so, with the pivots 77 and 64, so that then the engagement of the pin 66 with the slot 73 serves to lock the member 60 in position so that it cannot rock about its pivot 62. When the parts of the locking member are in the position shown at the right in Fig. 3, if the member 61 swings downward, its pin 67 will enter the slot 73 of the locking member 69, and will swing such locking member around in the direction indicated by the arrow in Fig. 3, carrying it into a position corresponding with that shown at the left in Fig. 3, and automatically locking it in such position. It will be understood, of course, that when the car bed is in its normal or carrying position, both of the locking members 68—69 are in locking position, but either one may be released by rocking the proper rock shaft 54 or 55. In the construction illustrated, I have shown the swinging members 60—61 as being in the form of hollow frames, the parts of the locking devices being for the most part inclosed in said frames, so that they are protected from dirt and injury.

The operation of my improved dump car is as follows:—When the car is being loaded or is transporting a load, the bed is in its horizontal position and both pistons or plungers are at the bottom of their respective cylinders, as illustrated at the right in Fig. 2. At this time both locking members 68—69 are in the position shown at the left in Fig. 3, in which position they operate through the bars 18 to hold the car bed in its horizontal position, by reason of the fact that such bars then cannot swing upward, and consequently hold the end gates down on the sills 78—79 of the car. At this time both arms 41—42 will be in the position shown at the right in Fig. 2, their respective heads being in engagement with the knobs 58—59 of the arms 56—57, respectively. If the car is to be dumped to the right, as indicated by dotted lines in Fig. 2, air is admitted to the cylinder 19, thereby raising its piston. This operates to swing the arm 41 upward, which, through the engagement of its head 47 with the arm 56, rocks the shaft 54, so as to swing the locking member 68 into releasing position. This allows the swinging members 60 at the opposite ends of the car, with the side gate operating bars 18 connected with them, to swing upward, as is necessary in the dumping of the bed. As the arms 41 continue to rise, their upper ends automatically swing outward slightly and move into engagement with the bearing-plate 51, as shown in Fig. 2, so that as such movement continues they lift on the left-hand side of the car bed, causing it to swing over to the right, as shown by the dotted lines in Fig. 2. The side gate at the right-hand side is held up in the usual way by the operating bars 18 thereof, permitting the load to be discharged. When the car bed is so tilted, the right-hand end of the bearing-plate 51 engages the upper ends of the arms 42 and swings them to the left, as shown by dotted lines in Fig. 2, thereby throwing the heads 48 of such arms out of engagement with the arms 57 of the rock shaft 55. This also is shown in dotted lines in Fig. 2. When the load has been discharged, the cylinder 19 is connected with the exhaust, so that the air therein may pass out, which allows the piston 21 to descend by gravity. At the same time air is admitted to cylinder 20, causing its piston to rise, but as the arms 42 connected with said piston have been disengaged from the arms 57 of the rock shaft 55, as above described, this movement of the piston 22 does not operate to release the lock at the right-hand side of the car, and consequently the side gate operating bars 18 at that side are held down in their normal position, so that when the car bed returns to its horizontal position, it will be prevented from going over to the opposite side by the right-hand side gate. As the piston 22 rises, the rock shaft 32 carried by it will engage the bearing-plate 51, being swung outward by the links 34, and will operate to lift the right-hand side of the car bed up to its horizontal position. At the same time the restoring of the car bed to its horizontal position will permit the side gate operating bars 18 of the side gate 14 to descend, swinging the member 60 downward and inward, until its pin 66 engages the locking device 68 and is again locked in position. The car is then ready to receive a new load.

It will be apparent from the foregoing description, that the car bed, when in carrying position, is at all times locked against tilting at either side, and that after it has been dumped at either side the locking devices at the dumping side remain operative, so that when the bed is restored to its horizontal position it cannot tip over to the other side without the actuation of the appropriate piston.

In some cases it is desirable to remove the side gates of the car in order to enable it to receive a large amount of stone or other load which extends beyond the side gates, or for other purposes, and as in such case the side gate operating bars 18 are also removed, it is necessary that other means be provided for connecting the swinging members 60—61 with the car bed in order that the locking mechanism may act thereupon. In such circumstances I connect the sides of the car bed with the swinging members 60—61 by suitable connections, such as chains 80, shown in Fig. 7, the operation in this case being the same as that already described, except that the car bed is held against tilting when locked by means of the chains instead of by the side gates and their connections.

That which I claim as my invention, and desire to secure by Letters Patent, is,—

1. A dump-car, comprising a suitable support, a rocking car bed, a swinging member mounted on said support and operatively connected with one side of the car bed so as to swing when said bed is tilted to dump its load at the opposite side of the car, locking means for normally holding said swinging member against movement, a rock-shaft connected with said locking means and adapted when rocked to release said swinging member, a fluid-pressure-operated piston, and connecting means normally connecting said piston and rock-shaft so that said rock-shaft is rocked by the action of the piston, said connecting means being adapted to be actuated by the tilting of the bed in one direction to disconnect the piston from the rock-shaft.

2. A dump-car, comprising a suitable support, a rocking car bed, a swinging member mounted on said support and operatively connected with one side of the car bed so as to swing when said bed is tilted to dump its load at the opposite side of the car, locking means for normally holding said swinging member against movement, a rock-shaft connected with said locking means and adapted when rocked to release said swinging member, a fluid-pressure-operated piston, a member pivotally mounted between its ends and moving with the piston, said member having means adapted to engage and operate said rock-shaft when the piston is actuated to tilt the bed, and being adapted to be actuated by the bed when the latter is tilted in one direction, to disengage the rock-shaft.

3. A dump-car, comprising a suitable support, a rocking car bed, fluid-pressure-operated pistons, arms connected with said pistons and actuated thereby to engage the bed for tilting the same, locking mechanism for normally locking the bed in operative position, and means actuated by said arms for releasing said locking devices to permit the bed to be tilted, the arm on the discharge side of the car being arranged to be disconnected from the locking mechanism by the tilting of the bed.

4. A dump car comprising a suitable support, a rocking car bed, fluid-pressure-operated pistons for rocking the bed in one direction or the other, arms connected between their ends with said pistons and with said support, said arms being adapted to engage the car bed for rocking the same, and locking devices for locking the bed in operative position, the locking device on the side of the bed to be elevated being actuated by the appropriate arm, when said arm is operated to dump the bed, to release the bed on that side and permit it to be dumped, the arm on the dumping side of the bed being rendered inoperative by the dumping of the bed, to actuate the locking device on the latter side of the bed, whereby the bed may be restored to its operative position without releasing the lock on the dumping side thereof.

5. A dump car comprising a suitable support, a rocking car bed, swinging links connected with said support and projecting at opposite sides thereof, fluid-pressure-operated pistons connected with said links, arms connected with said links and actuated by said pistons to engage the car bed for tilting the same, and means actuated by the movement of either piston to dump the bed, for releasing the locking devices at the side to be elevated.

6. A dump car comprising a suitable support, a rocking car bed, swinging links connected with said support and projecting at opposite sides thereof, fluid-pressure-operated pistons connected with said links, arms connected with said links and actuated by said pistons to engage the car bed for tilting the same, and locking devices for holding the car bed in its operative position, said locking devices being engaged and actuated by said arms, when the latter are operated to dump the car, to release the appropriate locking device and permit the car to be dumped.

7. A dump car comprising a suitable support, a rocking car bed, swinging links connected with said support and projecting outwardly therefrom, arms mounted between their ends upon said links, pistons connected with said links for rocking the same, said arms being adapted to engage and tilt the car bed, and locking devices for holding the car bed in operative position, each of said locking devices comprising a rock shaft and an arm connected therewith and adapted to be actuated by one of said first-mentioned arms to release the bed at the side to be elevated when the latter arm is actuated to dump the car.

8. A dump car comprising a suitable support, a rocking car bed, locking devices for holding the car bed in operative position, each of said locking devices comprising a rock shaft and an arm connected therewith, swinging links connected with said support and projecting outwardly therefrom, arms mounted between their ends upon said links, the latter arms being adapted to engage and tilt the car bed and being normally in operative engagement with said rock shaft arms, and pistons connected with said links for swinging the same.

9. A dump car comprising a suitable support, a rocking car bed, locking devices for holding the car bed in operative position, each of said locking devices comprising a rock shaft and an arm connected therewith, swinging links connected with said support and projecting outwardly therefrom, lock releasing arms mounted between their ends upon said links and being normally in engagement with said rock shaft arms, the lock releasing arm at the dumping side of the bed being adapted to be disengaged from its rock shaft arm by the dumping of the bed, and pistons connected with said links for swinging the same.

10. A dump car comprising a suitable support, a rocking car bed, locking devices for holding the car bed in operative position, each of said locking devices comprising a rock shaft and an arm connected therewith for rocking the same, swinging links connected with said support, lock-releasing arms mounted between their ends upon said links, said lock-releasing arms having heads adapted to be moved into and out of operative engagement with said rock shaft arms, said lock-releasing arms being movable into engagement with the car bed for tilting the same, and fluid-pressure-operated pistons for swinging said links.

11. A dump car comprising a suitable support, a rocking car bed, locking devices for holding the car bed in operative position, each of said locking devices comprising a rock shaft and an arm connected therewith for rocking the same, swinging links connected with said support, lock-releasing arms mounted between their ends upon said links, said lock-releasing arms having heads adapted to be moved into and out of operative engagement with said rock shaft arms, said lock-releasing arms being movable into engagement with the car bed for tilting the same, and fluid-pressure-operated pistons for swinging said links, the lock-releasing arm at the dumping side of the bed being adapted to be disengaged from its rock shaft arm by the dumping of the bed.

12. A dump car comprising a suitable support, a rocking car bed, locking devices for holding the car bed in operative position, each of said locking devices comprising a rock shaft and an arm connected therewith for rocking the same, swinging links connected with said support, lock-releasing arms mounted between their ends upon said links, said lock-releasing arms having heads adapted to be moved into and out of operative engagement with said rock shaft arms, said lock-releasing arms being movable into engagement with the car bed for tilting the same, fluid-pressure-operated pistons for swinging said links, and swinging members connected with said support and actuated by the rocking of the bed, said swinging members being adapted to be engaged and retained by said locking devices when the latter are in operative position.

13. A dump car comprising a suitable support, a rocking car bed, locking devices for holding the car bed in operative position, each of said locking devices comprising a rock shaft and an arm connected therewith for rocking the same, swinging links connected with said support, lock-releasing arms mounted between their ends upon said links, said lock-releasing arms having heads adapted to be moved into and out of operative engagement with said rock shaft arms, said lock-releasing arms being movable into engagement with the car bed for tilting the same, fluid-pressure-operated pistons for swinging said links, the lock-releasing arm at the dumping side of the bed being adapted to be disengaged from its rock shaft arm by the dumping of the bed, and swinging members connected with said support and actuated by the rocking of the bed, said swinging members being adapted to be engaged and retained by said locking devices when the latter are in operative position.

14. A dump car comprising a suitable support, a rocking car bed, swinging members pivotally connected with said support and actuated by the rocking of the bed, locking devices adapted to engage said swinging members to lock the bed in operative position, said locking devices being substantially inclosed within said swinging members, fluid-pressure-operated pistons for rocking the bed to dump or to right it, and means actuated by the movement of one or the other of said pistons to dump the bed, to release the appropriate swinging member from its locking device and permit the bed to be dumped.

JAY B. RHODES.

Witnesses:
M. A. SPERRY,
M. C. ATWOOD.